( 12 ) United States Patent
Nakamura et al.

(10) Patent No.: US 12,330,694 B2
(45) Date of Patent: Jun. 17, 2025

(54) RAIL VEHICLE

(71) Applicant: Hitachi, Ltd., Tokyo (JP)

(72) Inventors: Hideyuki Nakamura, Tokyo (JP); Mitsuo Iwasaki, Tokyo (JP); Takashi Miyanaga, Tokyo (JP); Kimiyasu Yoshimura, Tokyo (JP); Hiromitsu Nagarekawa, Tokyo (JP); Shinji Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 669 days.

(21) Appl. No.: 17/762,812

(22) PCT Filed: Sep. 29, 2020

(86) PCT No.: PCT/JP2020/036837
§ 371 (c)(1),
(2) Date: Mar. 23, 2022

(87) PCT Pub. No.: WO2022/070240
PCT Pub. Date: Apr. 7, 2022

(65) Prior Publication Data
US 2022/0363295 A1  Nov. 17, 2022

(51) Int. Cl.
*B61D 27/00* (2006.01)
*B61D 17/10* (2006.01)
(Continued)

(52) U.S. Cl.
CPC ......... *B61D 27/0018* (2013.01); *B61D 17/10* (2013.01); *B61F 1/12* (2013.01); *B61F 1/14* (2013.01)

(58) Field of Classification Search
CPC ...... B61F 1/00; B61F 1/08; B61F 1/14; B61F 5/02; B61F 1/12; B61F 5/04; B61D 17/10; B61D 27/0018
See application file for complete search history.

(56) References Cited

U.S. PATENT DOCUMENTS

2002/0157564 A1* 10/2002 Okuno ................... B61D 15/06
                                                       105/396
2002/0157565 A1   10/2002 Norton et al.
(Continued)

FOREIGN PATENT DOCUMENTS

CN      105292152 A  *  2/2016  ............... B61D 1/06
CN      105083311 B      8/2018
(Continued)

OTHER PUBLICATIONS

Taiwanese-language Office Action issued in Taiwanese Application No. 110135294 dated Apr. 8, 2022 (three (3) pages).
(Continued)

*Primary Examiner* — S. Joseph Morano
*Assistant Examiner* — Cheng Lin
(74) *Attorney, Agent, or Firm* — Crowell & Moring LLP

(57)  ABSTRACT

A rail vehicle includes a roof structure, a side structure, a gable end structure, and an underframe. The underframe is configured from a hollow shaped member that includes a first upper side face plate arranged at a central portion in a widthwise direction of the underframe, a first lower side face plate arranged at the central portion, a second upper side face plate arranged at an end portion and positioned below the first upper side face plate, a second lower side face plate arranged at the end portion and positioned below the first lower side face plate, a third upper side face plate that connects the first upper side face plate and the second upper side face plate to each other, and a third lower side face plate that connects the first lower side face plate and the second lower side face plate to each other.

7 Claims, 8 Drawing Sheets

(51) Int. Cl.
  *B61F 1/12*  (2006.01)
  *B61F 1/14*  (2006.01)

(56) References Cited

U.S. PATENT DOCUMENTS

| | | | |
|---|---|---|---|
| 2003/0056684 A1 | | 3/2003 | Nakamura et al. |
| 2015/0203130 A1* | | 7/2015 | Langert .................. B61D 17/10 |
| | | | 105/422 |
| 2015/0203131 A1* | | 7/2015 | Langert .................. B61D 17/10 |
| | | | 105/422 |
| 2022/0402532 A1* | | 12/2022 | Sato ........................ B61D 17/10 |

FOREIGN PATENT DOCUMENTS

| | | |
|---|---|---|
| DE | 10 2013 219 794 A1 | 4/2015 |
| EP | 2 204 309 B1 | 2/2014 |
| EP | 3 130 517 A1 | 2/2017 |
| EP | 3 659 892 A1 | 6/2020 |
| EP | 3 939 853 A1 | 1/2022 |
| JP | 7-186948 A | 7/1995 |
| JP | 3725057 B2 | 12/2005 |
| JP | 4163925 B2 | 10/2008 |
| JP | 2017121824 A * | 7/2017 |
| JP | 6552971 B2 | 7/2019 |
| TW | 590927 B | 6/2004 |
| WO | WO-2015155832 A1 * | 10/2015 ............... B61C 5/02 |
| WO | WO-2016178265 A1 * | 11/2016 ............... B61F 1/12 |
| WO | WO 2020/184010 A1 | 9/2020 |

OTHER PUBLICATIONS

International Search Report (PCT/ISA/210) issued in PCT Application No. PCT/JP2020/036837 dated Nov. 17, 2020 (three (3) pages).

Japanese-language Written Opinion (PCT/ISA/237) issued in PCT Application No. PCT/JP2020/036837 dated Nov. 17, 2020 (three (3) pages).

Hindi-language Office Action issued in Indian Application No. 202217016740 dated May 16, 2023 with English translation (6 pages).

\* cited by examiner

B—B (air conditioner attaching portion)

FIG.5 cross section D-D

RAIL VEHICLE

TECHNICAL FIELD

The present invention relates to a rail vehicle.

BACKGROUND ART

A rail vehicle structure that is a structure of a rail vehicle is generally configured from a roof structure that configures an upper face, side structures that configure side faces, an underframe that configures a lower face, and gable end structures that configure end faces in the longitudinal direction. In recent years, in order to improve the manufacturability and the sound insulation, there has been widely spread a technique for assembling the roof structure, side structures, underframe, and so forth, which are configured from a hollow shaped member made of aluminum alloy including two face plates opposite to each other and a plurality of ribs that connect the face plates to each other, into a rail vehicle structure.

By application of a hollow shaped member to a rail vehicle structure, rigidity and strength necessary for the rail vehicle structure can be secured without combining and arranging beam members and reinforce members intricately, and therefore, manufacture of the rail vehicle structure is simplified. Further, since a bracket for attaching equipment or an interior member can be formed integrally with a hollow shaped member that configures the rail vehicle structure, there is no necessity to separately provide a bracket at an attaching portion for equipment or an interior member. This makes it possible to further simplify the manufacture.

For low and medium speed vehicles represented by conventional line vehicles, such a rail vehicle structure as depicted in FIG. 1 of Patent Document 1 has been put into practical use. In the rail vehicle structure, all of a roof structure, side structures and an underframe are configured from a hollow shaped member. On the other hand, in high speed vehicles represented by Shinkansen vehicles, such a rail vehicle structure as depicted in FIG. 1 of Patent Document 2 is adopted. The rail vehicle structure is configured from such a composite construction that a roof structure and side structures are configured from hollow shaped members and an underframe is configured from a plurality of beam members welded to a member with T ribs.

The actual situation that the underframe of a high speed vehicle is not configured from a hollow shaped member in this manner is described with reference to FIGS. 1 and 8. FIG. 1 is a perspective view of a railroad vehicle structure 1 of a high speed vehicle, and FIG. 8 is a cross sectional view taken along line A-A of the railroad vehicle structure 1 of the high speed vehicle depicted in FIG. 1.

In a high speed vehicle, it is necessary to keep the position of the center of gravity low in order to secure the stability in high speed traveling. To this end, an air conditioner 7 having a comparatively great mass is installed under an underframe 4 (refer to FIG. 1), and circulates air around the overall vehicle in the longitudinal direction through a supply air duct 13, a return air duct 14 and an exhaust air duct 20, which are disposed between the underframe 4 and a floor board 63.

Here, since the position of the floor board 63 in the heightwise direction is determined such that the floor board 63 does not have a level difference with respect to the platform of a station, it is necessary that the underframe 4 is arranged below the supply air duct 13, return air duct 14, and exhaust air duct 20 so as not to interfere with them. Moreover, since underfloor equipment is incorporated below the underframe 4, the structure in which the underframe 4 does not interfere with the underfloor equipment is required.

Incidentally, when a high speed vehicle advances into a tunnel, the pressure around the vehicle fluctuates significantly, and therefore, the railroad vehicle structure 1 of a high speed vehicle has an airtight structure in order to prevent passenger's ear clogging caused by an influence of such pressure fluctuation on the inside of the vehicle. Since such an airtight structure as just described causes a pressure difference between the outside and the inside of the vehicle, the railroad vehicle structure 1 is expanded or contracted in a direction of a cross section. The pressure difference is referred to as airtight pressure.

On the other hand, the underframe 4 has a planar shape such that the floor board 63 and underfloor equipment are mounted horizontally thereon. Generally, a planar plate is structurally weak against a pressure acting in an out-of-plane direction compared with a curved plate and is likely to suffer from excessive deformation or stress. Accordingly, it is necessary for the underframe 4 to have a structure in which a sufficiently high second moment of area and section modulus are provided in order to reduce such deformation and stress.

In order that the conditions described above are satisfied, thin shaped members 61 with T ribs are used for the underframe 4 of a high speed vehicle, and this is intended to avoid interference of the underframe 4 with the air conditioning ducts such as the supply air duct 13, return air duct 14, and exhaust air duct 20 and the underfloor equipment. Further, arrangement of a cross beam 62 having a height in the upward and downward direction of the vehicle at a position at which the cross beam 62 does not interfere with the underfloor equipment is intended to secure a sufficiently high second moment of area and section modulus against the airtight pressure.

In short, since air conditioning ducts and underfloor equipment are crowded above and below the underframe of a high speed vehicle, it is difficult to secure high rigidity and strength against the airtight pressure using hollow shaped members that avoid interference with them.

In order to solve this problem, such a rail vehicle structure as depicted in FIG. 2 of Patent Document 3 has been proposed. In the rail vehicle structure, an underframe is configured from a hollow shaped member that has a thickness increased at a central portion in the widthwise direction thereof compared with that at end portions in the widthwise direction thereof such that rigidity and strength against the airtight pressure that generates significant bending load at the central portion in the widthwise direction of the underframe are secured.

In such a rail vehicle structure as just described, by making use of the inner side of a hollow shaped member at a middle portion in the widthwise direction of the underframe having an increased thickness as a space for return air, circulation of air around the overall vehicle in the longitudinal direction is allowed without sacrificing the space above or below the floor. However, thick hollow shaped members are high in difficulty in manufacture and have a tendency to increase the thickness and to decrease the size in comparison with hollow shaped members having a general thickness. This gives rise to increase the manufacture cost arising from increase in the mass of the rail vehicle structure and from increase in the welding amount. Further, utilization of the inside of hollow shaped members as a space for return air gives rise to increase the manufacture cost arising from increase in the processing amount of hollow shaped members.

PRIOR ART DOCUMENT

Patent Documents

Patent Document 1: Japanese Patent No. 3725057
Patent Document 2: Japanese Patent No. 4163925
Patent Document 3: Japanese Patent No. 6552971

SUMMARY OF THE INVENTION

Problem to be Solved by the Invention

In order to reduce the manufacture cost of a rail vehicle, it is desirable to configure a rail vehicle structure from hollow shaped members to simplify the manufacture. However, since air conditioning ducts and underfloor equipment are crowded above and below the underframe of a high speed vehicle, it is difficult to use hollow shaped members that avoid interference with them to secure high rigidity and strength against the airtight pressure and suppress increase in the mass and increase in the manufacture cost. In other words, there is a problem to be solved in that, while the underframe of a high speed vehicle is configured from hollow shaped members, interference of the underframe with air conditioning ducts and underfloor equipment is avoided and sufficient rigidity and strength against the airtight pressure are secured and besides increase in the mass and increase in the manufacture cost are suppressed.

It is an object of the present invention to provide a rail vehicle simplified in manufacture and reduced in manufacture cost, by configuring an underframe from hollow shaped members that suppress increase in the mass and in the manufacture cost, while interference of the underframe with air conditioning ducts and underfloor equipment is avoided and sufficient rigidity and strength against the airtight pressure are secured.

Means for Solving the Problem

In order to solve the problem described above, one of representative rail vehicles of the present invention is achieved by a rail vehicle, including: a roof structure that configures an upper face; a side structure that configures a side face; a gable end structure that configures an end face in a longitudinal direction; and an underframe that configures a lower face. The underframe is configured from a hollow shaped member formed from two face plates and a rib that connects the face plates to each other. The hollow member that configures the underframe includes a first upper side face plate arranged at a central portion in a widthwise direction of the underframe, a first lower side face plate arranged at the central portion in the widthwise direction of the underframe, a second upper side face plate arranged at an end portion in the widthwise direction of the underframe and positioned below the first upper side plate, a second lower side face plate arranged at the end portion in the widthwise direction of the underframe and positioned below the first lower side face plate, a third upper side face plate that connects the first upper side plate and the second upper side plate to each other, and a third lower side face plate that connects the first lower side face plate and the second lower side face plate to each other. A space is provided below the first lower side face plate and a closing plate that connects adjacent end portions of a pair of the second lower side face plates to each other is arranged in the space.

Advantages of the Invention

According to the present invention, a rail vehicle simplified in manufacture and reduced in manufacture cost is provided, by configuring an underframe from hollow shaped members that suppress increase in the mass and in the manufacture cost, while interference of the underframe with air conditioning ducts and underfloor equipment is avoided and sufficient rigidity and strength against the airtight pressure are secured.

Configurations and working-effects other than those described above are made clear from the description of embodiments hereinafter described.

MODES FOR CARRYING OUT THE INVENTION

In the following, a rail vehicle that is an embodiment of the present invention is described with reference to the drawings. The rail vehicle is a generic name for vehicles operated along a laid rail and signifies railroad vehicles, trams, new transportation system vehicles, monorail vehicles and so forth. In the following, embodiments of the present invention are described taking a railroad vehicle as a representative example of rail vehicles with reference to the drawings.

Embodiments

Figure 1:
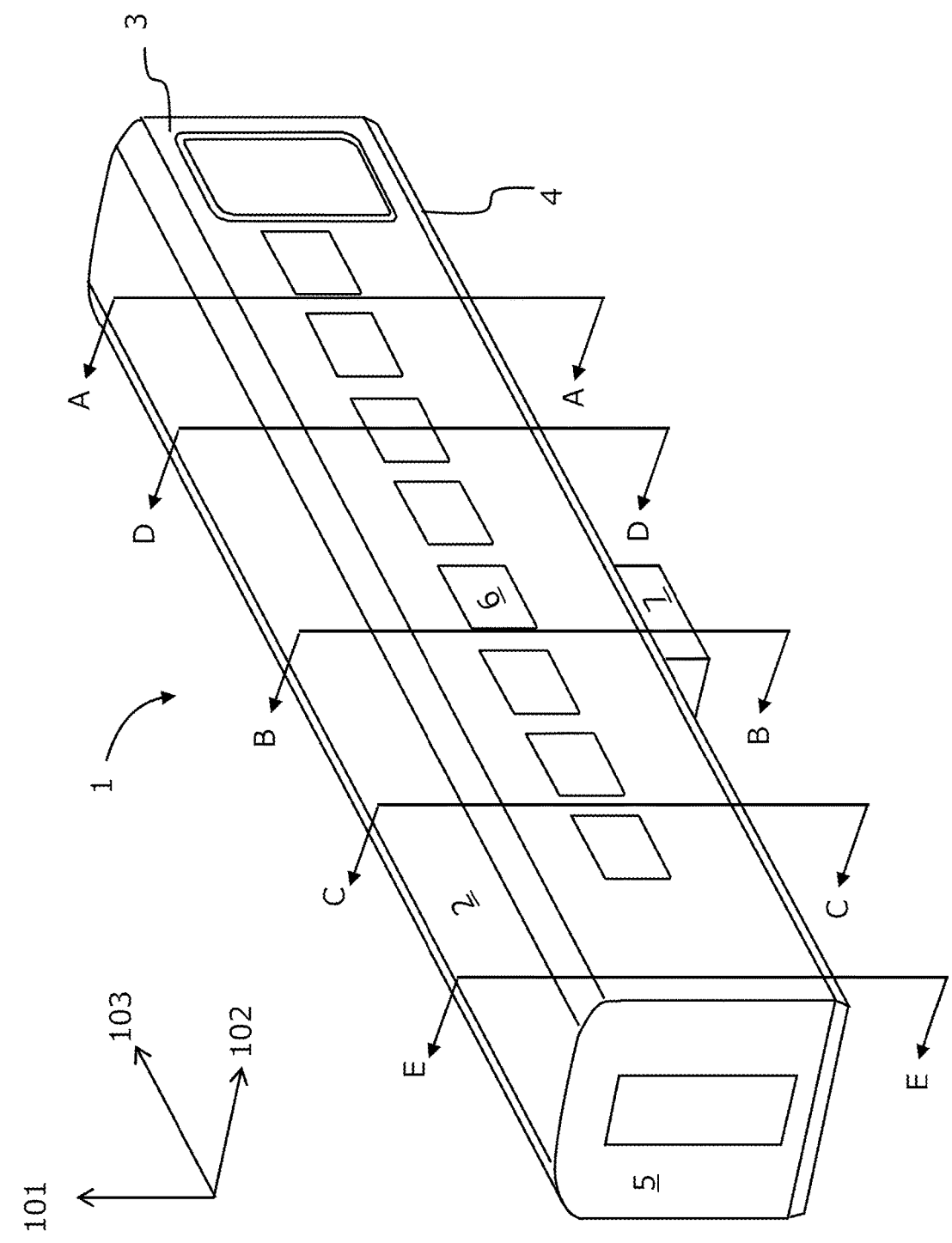
FIG. 1 is a perspective view of a railroad vehicle structure for a high speed vehicle.

FIG. 1 is a perspective view schematically depicting an example of a railroad vehicle structure. As depicted in FIG. 1, the upward and downward (heightwise) direction of the railroad vehicle structure 1 is denoted by 101, and the widthwise direction and the longitudinal direction orthogonal to the upward and downward (heightwise) direction 101 are denoted by 102 and 103, respectively.

The railroad vehicle structure 1 is configured from side structures 3, 3 (only one of which is depicted) provided uprightly at the opposite end portions of the underframe 4 in the widthwise direction 102, gable end structures 5, 5 (only one of which is depicted) provided uprightly at the opposite end portions of the underframe 4 in the longitudinal direction 103, and a roof structure 2 placed at upper end portions of the side structures 3, 3 and the gable end structures 5, 5 in the upward and downward (heightwise) direction 101. In the side structures 3, 3, doorways through which passengers get on and off and windows 6 for allowing passengers to see the scenery outside the railroad vehicle structure 1 therethrough are provided. An air conditioner 7 for circulating the air in the vehicle is provided below the underframe 4.

Figure 2:
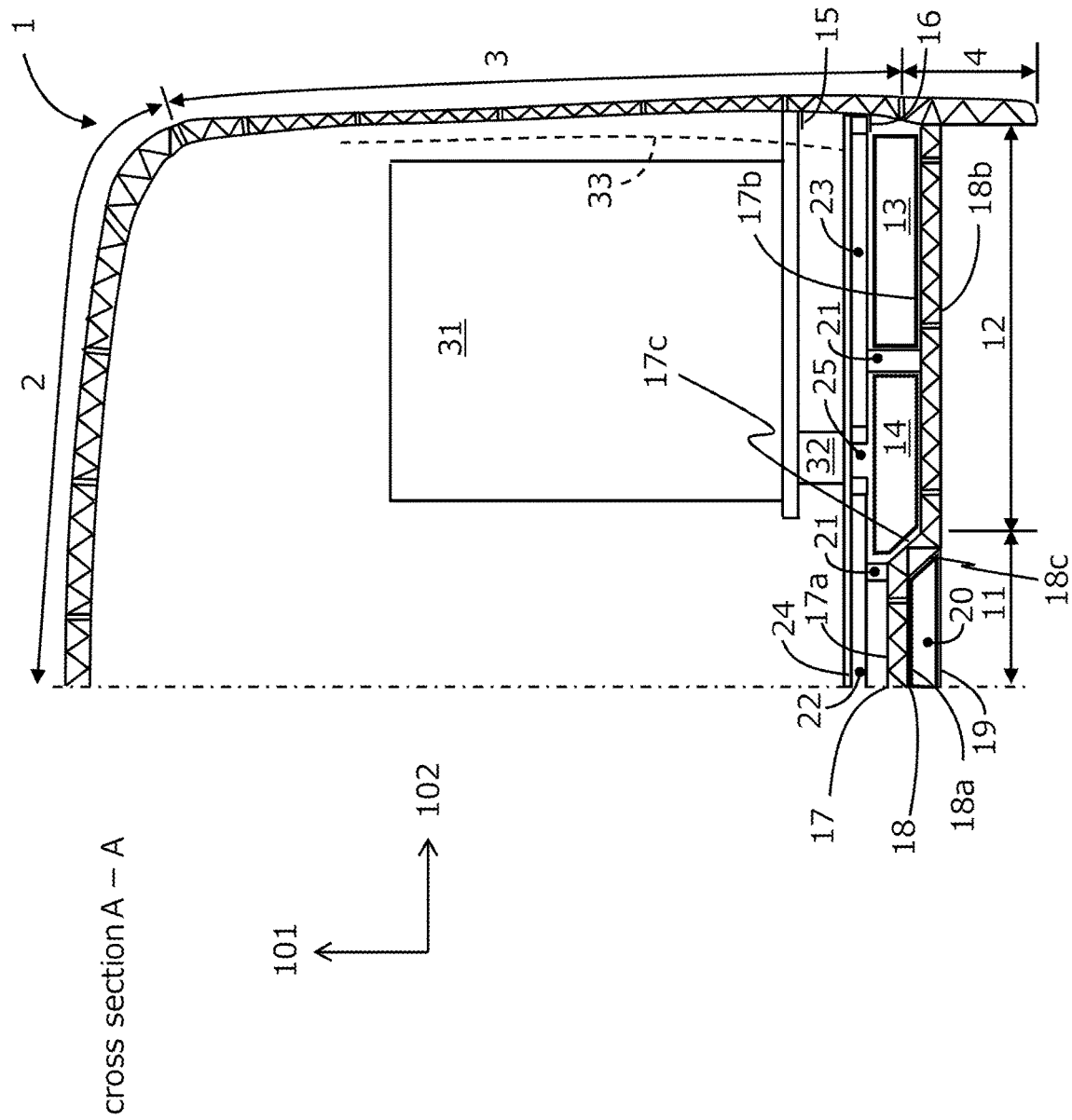
FIG. 2 is a vertical sectional view of a general portion (A-A portion) of the railroad vehicle structure depicted in FIG. 1 according to an embodiment of the present invention.

FIG. 2 depicts a cross sectional view taken along line A-A of the railroad vehicle structure 1 depicted in FIG. 1. The roof structure 2, a side structure 3, and the underframe 4 are configured by joining hollow shaped members made of aluminum alloy and configured from two face plates facing each other and a plurality of ribs that connect the face plates to each other. Further, the extrusion direction of them is the longitudinal direction 103 of the railroad vehicle structure 1. In the following, the configuration of the underframe 4 is described in detail.

The position in the upward and downward direction 101 of an upper side face plate 17 of a hollow shaped member that configures an upper face of a central portion underframe 11 positioned at a central portion in the widthwise direction 102 is higher than the position in the upward and downward direction 101 of the upper side face plate 17 of a hollow shaped member that configures an upper face of an end portion underframe 12 positioned at an end portion in the widthwise direction 102. Further, the position in the upward and downward direction 101 of a lower side face plate 18 of a hollow shaped member that configures the bottom face of the end portion underframe 12 is higher than the position in the upward and downward direction 101 of the lower side face plate 18 of a hollow shaped member that configures the bottom face of the end portion underframe 12. The upper side face plate 17 and the lower side face plate 18 of the central portion underframe 11 and the end portion underframe 12 are individually positioned on substantially horizontal planes. If the central portion underframe 11 and the end portion underframe 12 have a substantially equal thickness, then they can be formed using hollow shaped members formed by the same process, and therefore, the cost can be reduced.

The upper side face plate 17 includes a first upper side face plate 17a positioned on the upper face of the central portion underframe 11, a second upper side face plate 17b positioned on the upper face of the end portion underframe 12, and a third upper side face plate 17c that connects the first upper side face plate 17a and the second upper side face plate 17b to each other smoothly. Meanwhile, the lower side face plate 18 includes a first lower side face plate 18a positioned on the bottom face of the central portion underframe 11, a second lower side face plate 18b positioned on the lower face of the end portion underframe 12, and a third lower side face plate 18c that connects the first lower side face plate 18a and the second lower side face plate 18b to each other smoothly. The second upper side face plate 17b is positioned below the first upper side face plate 17a, and the second lower side face plate 18b is positioned below the first lower side face plate 18a.

That is, the underframe 4 is formed such that the end portion underframe 12 is displaced downwardly with respect to the central portion underframe 11. End portions (only one of which is depicted) on the center side in the widthwise direction 102 of the lower side face plates 18 of a hollow shaped member that configure the end portion underframes 12 are coupled to each other by a closing board 19, and the lower face side of the central portion underframe 11 is shielded.

In an upper region of the end portion underframe 12 (supply air space and return air space surrounded by the second upper side face plate 17b, the third upper side face plate 17c, the floor board 63, a floor board support 21, and a vehicle inner side face of the side structure 3), a supply air duct 13 for carrying air from the air conditioner 7 into the inside of the vehicle is provided on an end side in the widthwise direction 102 while a return air duct 14 for carrying air from the inside of the vehicle to the air conditioner 7 is provided on the center side in the widthwise direction 102. The supply air duct 13 and the return air duct 14 extend along the longitudinal direction 103 of the railroad vehicle structure 1, and the lower face of the return air duct 14 extends along the upper side face plate 17 from the end portion underframe 12 to a location at which the end portion underframe 12 and the central portion underframe 11 are connected to each other smoothly, such that the space can be utilized effectively. In other words, the cross section of the return air duct 14 has a pentagonal shape conforming to the connection portion between the end portion underframe 12 and the central portion underframe 11.

On the other hand, carrying of air to be exhausted from the inside to the outside of the vehicle is performed through the exhaust air duct 20 provided in a space surrounded by the lower side face plate 18 (first lower side face plate 18a and third lower side face plate 18c) of a hollow shaped member and the closing board 19, which configure the center portion underframe 11. The exhaust air duct 20 extends along the longitudinal direction 103 of the railroad vehicle structure 1, and the upper face of the exhaust air duct 20 extends along the lower side face plate 18 from the central portion underframe 11 to the location at which the central portion underframe 11 and the end portion underframe 12 are connected to each other smoothly, such that the space can be utilized effectively. In other words, the cross section of the exhaust air duct 20 has an isosceles trapezoidal shape conforming to the connection portion between the end portion underframe 12 and the central portion underframe 11.

The floor board support 21 is provided at an upper portion (at least one of the first upper side face plate 17a, second upper side face plate 17b, and third upper side face plate 17c) of the upper side face plate 17 in the proximity of the joining portion between the central portion underframe 11 and the end portion underframe 12, and a floor board holder 16 is provided on the vehicle inner side of the side structure 3. A central portion floor board 22 is supported on a substantially horizontal plane by the floor board support 21 above the central portion underframe 11 and the return air duct 14. An end portion floor board 23 is supported on a substantially horizontal plane by the floor board support 21 and the floor board holder 16 above the supply air duct 13 and the return air duct 14. The floor board is configured from the central portion floor board 22 and the end portion floor board 23.

Since the end portion floor board 23 is supported on the side structure 3, vibration from the underframe 4 is less likely to be transmitted to the inside of the vehicle. The positions of the central portion floor board 22 and the end portion floor board 23 in the heightwise direction 101 are substantially same as each other. Further, a gap 25 is provided between the central portion floor board 22 and the end portion floor board 23, and a floor covering 24 is attached to the upper face of the central portion floor board 22 and the end portion floor board 23.

A seat support 32 is provided at an upper portion of the central portion floor board 22 and the end portion floor board 23, and a seat holder 15 is provided on the vehicle inner side of the side structure 3. A seat 31 is supported on a substantially horizontal plane by the seat support 32 and the seat holder 15. An interior panel 33 (indicated by a broken line) for providing a better appearance to the inside of the vehicle is provided on a side face of the seat 31. The gap 25 between the central portion floor board 22 and the end portion floor board 23 is positioned below the seat 31.

Figure 3:
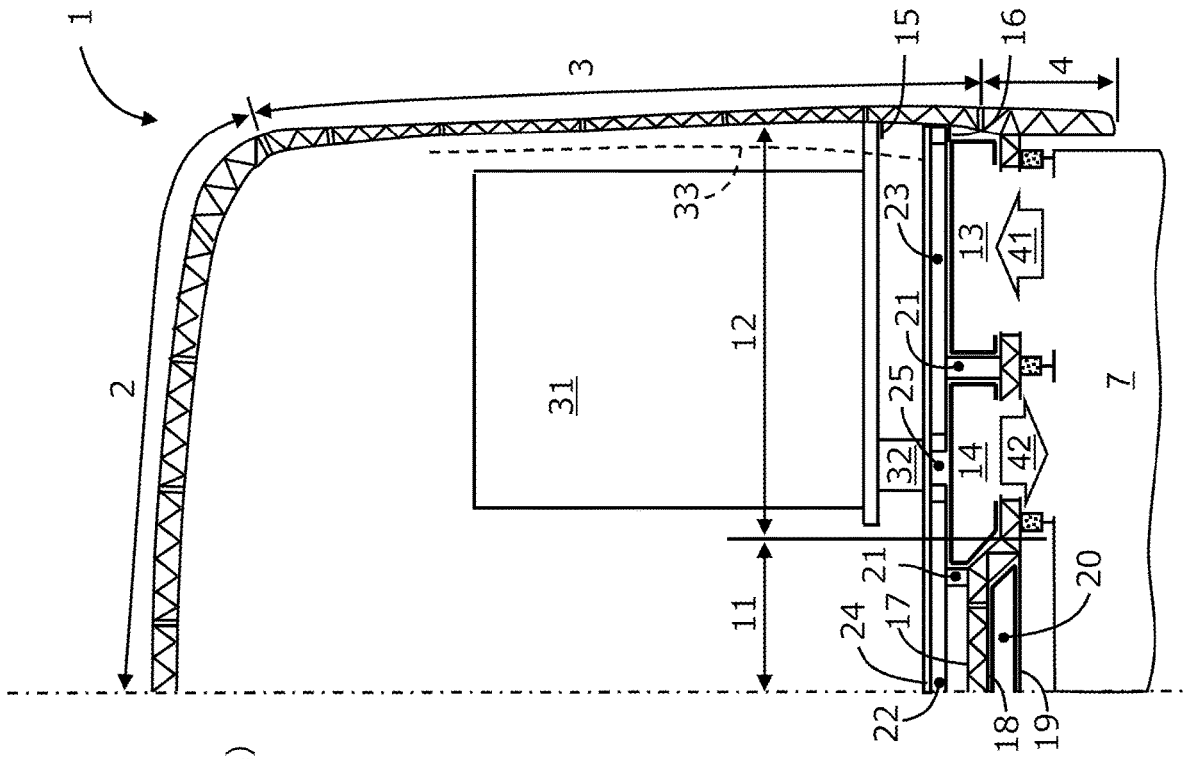
FIG. 3 is a vertical sectional view of an air conditioner attaching portion (B-B portion) of the railroad vehicle structure depicted in FIG. 1 according to the embodiment of the present invention.
Figure 4:
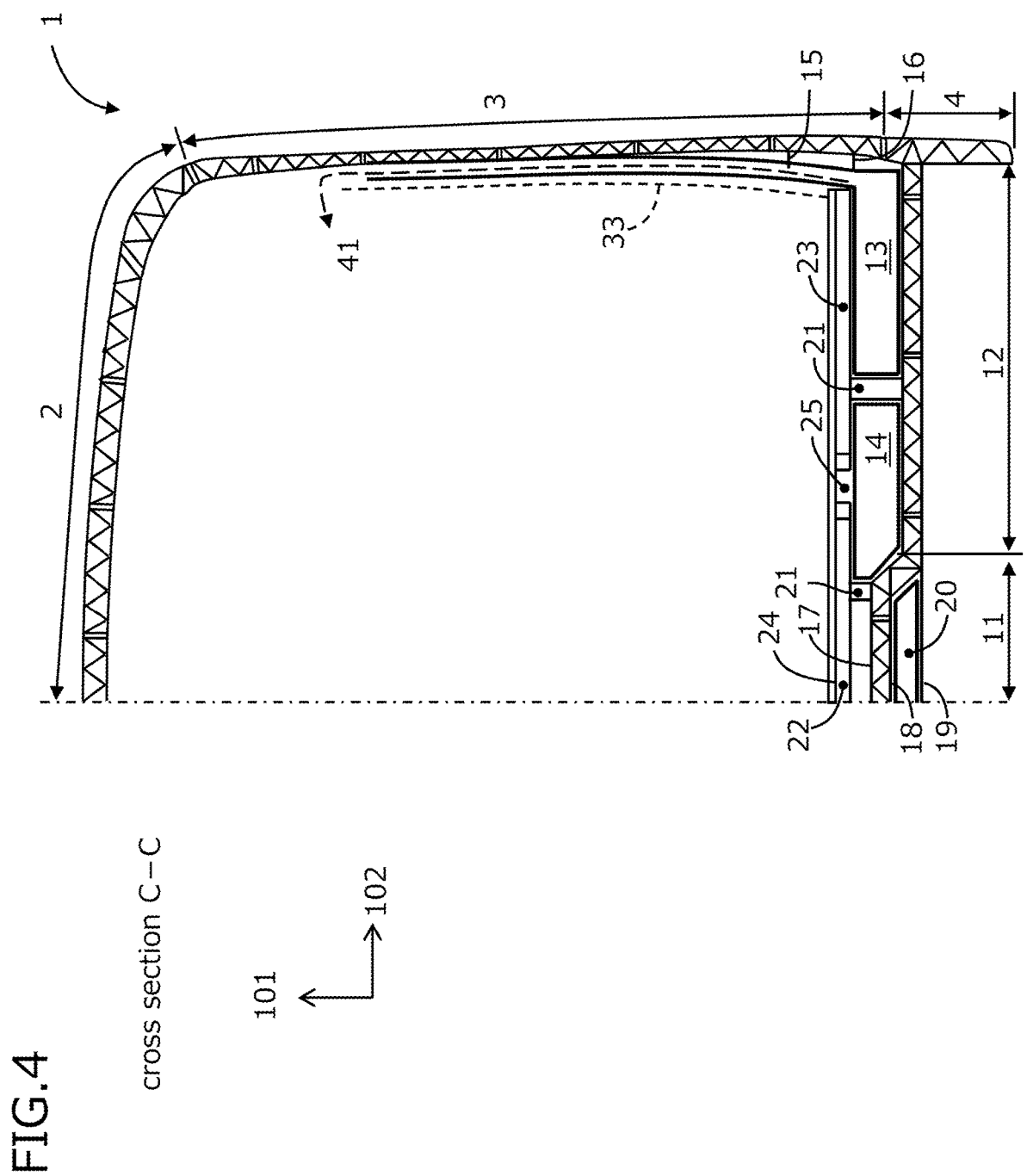
FIG. 4 is a vertical sectional view of a pier panel portion (C-C portion) of the railroad vehicle structure depicted in FIG. 1 according to the embodiment of the present invention.
Figure 5:
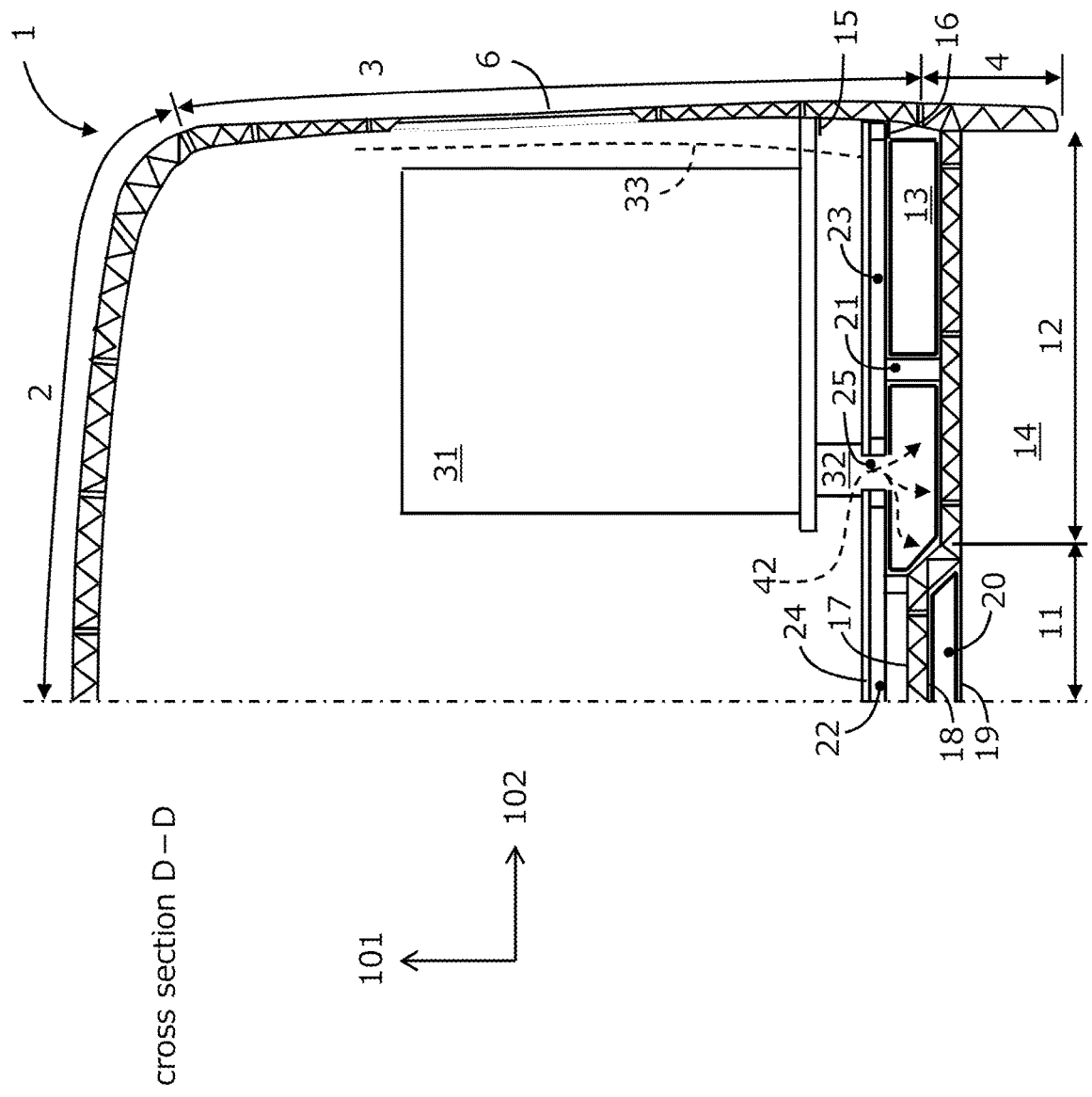
FIG. 5 is a vertical sectional view of a window portion (D-D portion) of the railroad vehicle structure depicted in FIG. 1 according to the embodiment of the present invention.
Figure 6:
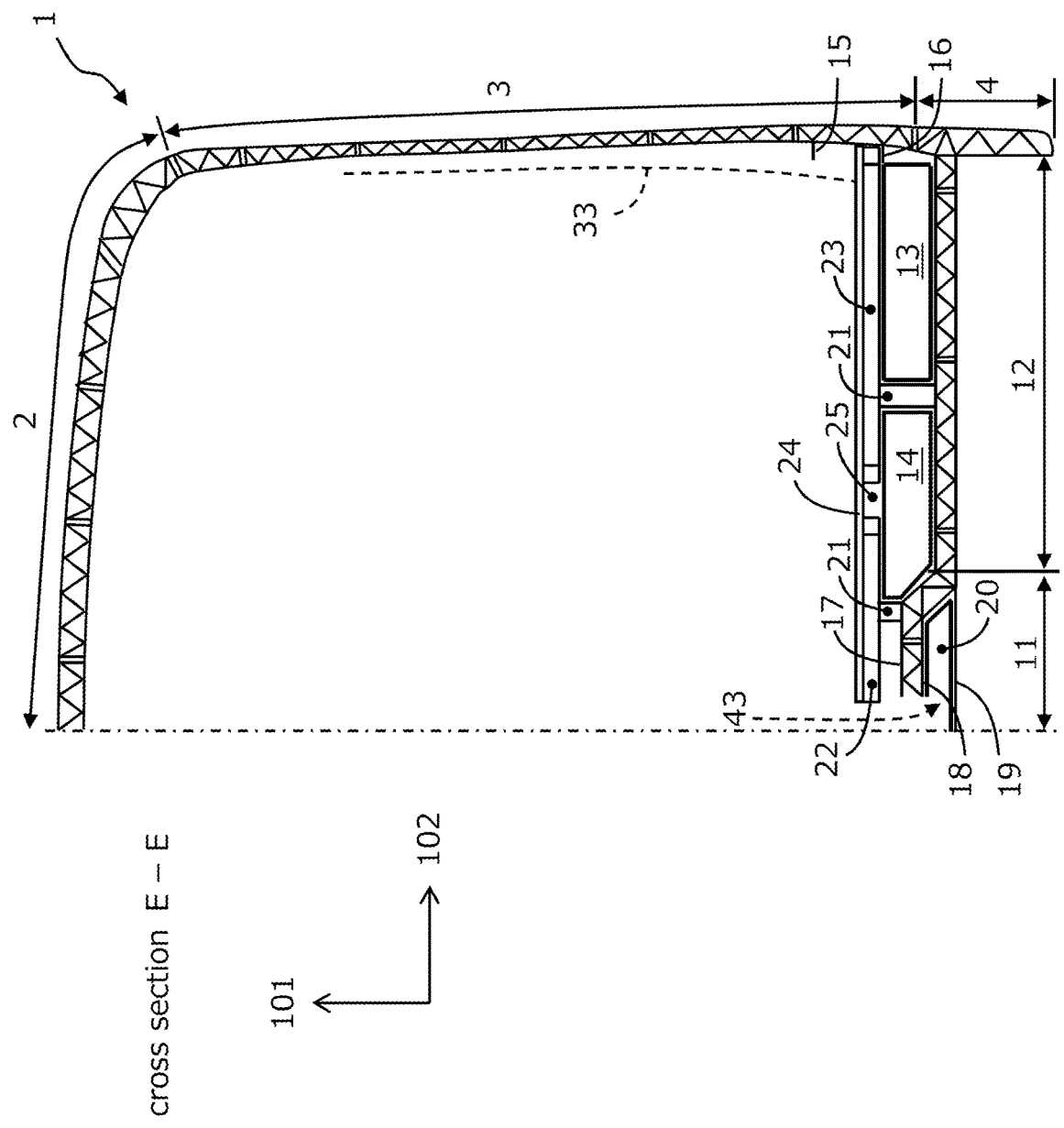
FIG. 6 is a vertical sectional view of a longitudinal end portion (E-E portion) of the railroad vehicle structure depicted in FIG. 1 according to the embodiment of the present invention.

A cross sectional view taken along line B-B of the railroad vehicle structure 1 depicted in FIG. 1 is depicted in FIG. 3; a cross sectional view taken along line C-C is depicted in FIG. 4; a cross sectional view taken along line D-D is depicted in FIG. 5; and a cross sectional view taken along line E-E is depicted in FIG. 6. FIG. 3 represents a vertical sectional view of an air conditioner attachment portion including the air conditioner 7; FIG. 4 represents a vertical sectional view of a pier panel portion between windows; FIG. 5 represents a vertical sectional view of a window portion; and FIG. 6 represents a vertical sectional view of a longitudinal end portion. In the following, air circulation in the inside of the vehicle according to the present embodiment is described with reference to the figures mentioned.

In the air conditioner attaching portion depicted in FIG. 3, an opening is provided on each the hollow shaped member configuring the end portion underframe 12, the closing board 19, the lower face of the supply air duct 13, the lower face of the return air duct 14, and the lower face of the exhaust air duct 20 so as to extend through them in the upward and downward (heightwise) direction 101.

Supply air 41 to be carried into the vehicle from the air conditioner 7 is supplied to the inside of the supply air duct 13 through the openings provided in the hollow shaped member configuring the end portion underframe 12 and the lower face of the supply air duct 13. Further, the supply air 41 is spread through the overall railroad vehicle structure 1 in the longitudinal direction 103 through the supply air duct 13.

On the other hand, return air 42 to be carried into the air conditioner 7 from the inside of the vehicle is returned to the air conditioner 7 through the openings provided on the hollow shaped member configuring the end portion underframe 12 and the lower face of the return air duct 14.

Further, exhaust air 43 to be carried from the inside to the outside of the vehicle is exhausted to the outside of the vehicle by a ventilation apparatus provided adjacent the air conditioner 7, through the openings provided on the closing board 19 and the lower face of the exhaust air duct 20.

The supply air 41 to be carried through the supply air duct 13 is supplied from an upper portion of a window into the inside of the vehicle through a branched portion of the supply air duct 13 extending in the upward and downward (heightwise) direction 101 between the side structure 3 and the interior panel 33 at the pier panel portion depicted in FIG. 4.

On the other hand, the return air 42 from the inside of the vehicle is supplied, at the window portion depicted in FIG. 5, to the return air duct 14 through an intake portion that passes through the gap 25 between the central portion floor board 22 and the end portion floor board 23. At the intake portion for the return air 42 from the inside of the vehicle, an opening is provided also on the upper face of the floor covering 24 and the return air duct 14 such that it extends through them in the upward and downward (heightwise) direction 101. It is to be noted that, although the intake portion for the return air 42 from the inside of the vehicle is provided here at a window portion (FIG. 5), it may otherwise be provided at the pier panel portion (FIG. 4) only if the location is lower than the seat 31 such that the appearance of the inside of the vehicle is not degraded.

Further, the exhaust air 43 from the inside of the vehicle is supplied to the exhaust air duct 20 through the opening provided on the central portion floor board 22 at an end portion in the longitudinal direction depicted in FIG. 6. At an intake portion for the exhaust air 43 from the inside of the vehicle, an opening is provided on the hollow shaped member configuring the central portion underframe 11 and the upper face of the exhaust air duct 20 so as to extend through them in the upward and downward (heightwise) direction 11. It is to be noted that, although the intake portion for the exhaust air 43 from the inside of the vehicle is provided here at an end portion in the longitudinal direction (FIG. 6) at which a toilet or the like at which odor is likely to occur is arranged, also it is possible to provide the intake portion for the exhaust air 43 at any other location at which air to be exhausted to the outside of the vehicle exists.

According to the configuration described above, the thickness of the underframe 4 represented by the distance in the upward and downward direction between the upper side face plate 17 and the closing board 19 of hollow shaped members is increased in the region of the central portion underframe 11. Therefore, sufficient rigidity and strength against the airtight pressure that applies significant bending load to the central portion underframe 11 can be secured.

Consequently, since the thickness of the hollow shaped member configuring the underframe 4 can be formed thinner, even if the supply air duct 13 and the return air duct 14 are arranged at an upper portion of the end portion underframe 12 and the exhaust air duct 20 is arranged at a lower portion of the hollow shaped member configuring the central portion underframe 11, interference with underfloor equipment can be avoided and besides increase in thickness and reduction in size of the hollow shaped members can be avoided while the position of the floor board 63 in the heightwise direction is maintained. Therefore, it becomes possible to configure the underframe of the railroad vehicle from hollow shaped members while avoiding increase in the manufacture cost arising from increase in the mass and in the welding amount. Consequently, manufacture of the railroad vehicle can be simplified and also the manufacture cost can be decreased.

Further, since the lower side face plate 18 of a hollow shaped member configuring the end portion underframe 12 is arranged on a substantially horizontal plane, it is possible to utilize a bracket formed integrally with the hollow shaped member to attach underfloor equipment. In other words, there is no necessity to separately provide a bracket at the attaching portion of the underfloor equipment, which brings further simplification in manufacture. In addition, since the upper side face plate 17 and the lower side face plate 18 of hollow shaped members configuring the underframe are connected to each other smoothly over a region from a central portion to an end portion, stress concentration due to sudden change in the thickness of the hollow shaped member can be avoided.

Another Embodiment

In the following, another embodiment of the rail vehicle according to the present invention is described. The configuration of the present embodiment is similar to that of the preceding embodiment except the wind paths for passing supply air and return air therethrough, and therefore, description of the configuration is omitted.

Figure 7:
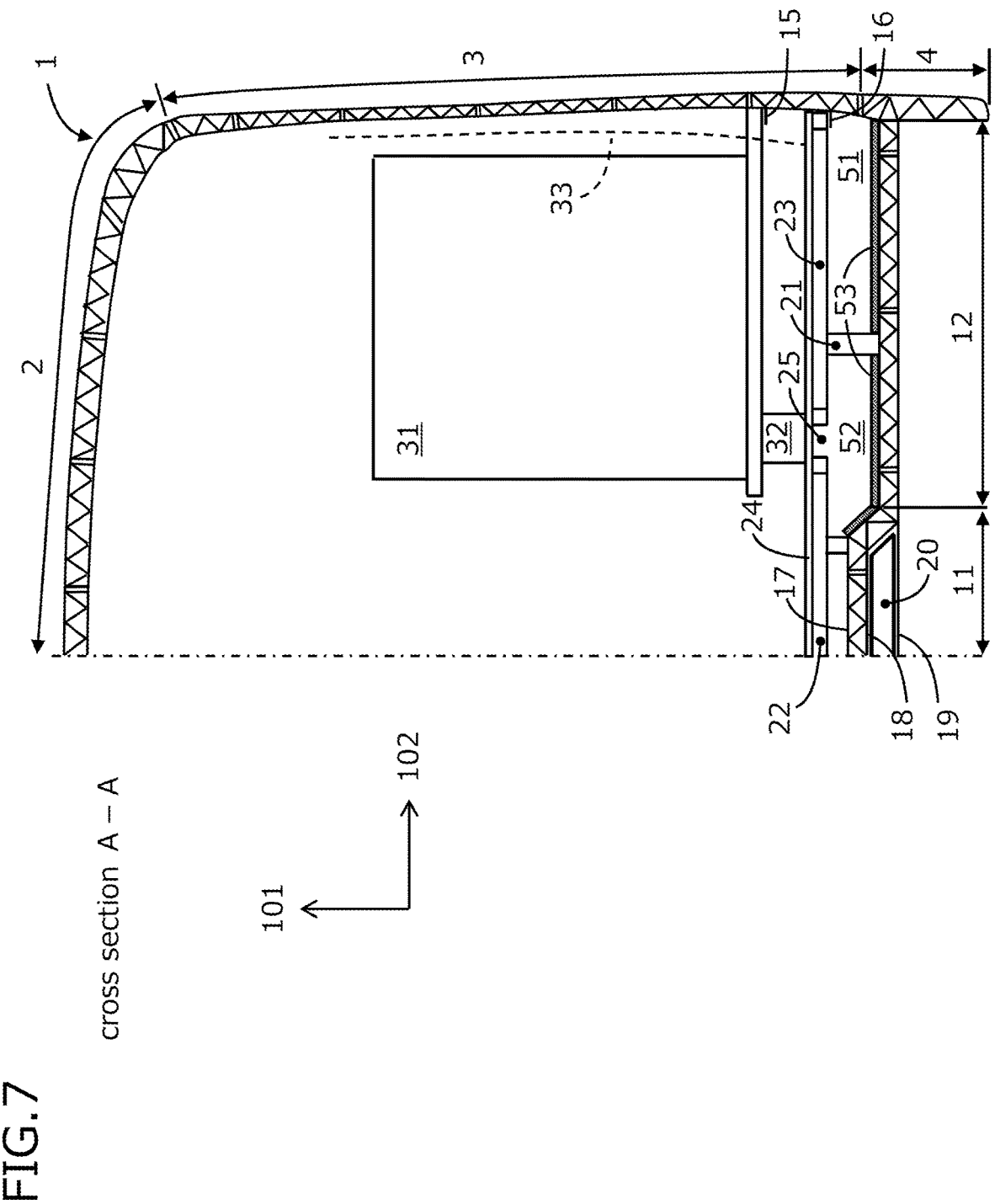
FIG. 7 is a vertical sectional view of a general portion (A-A portion) of a railroad vehicle structure depicted in FIG. 1 according to another embodiment of the present invention.
Figure 8:
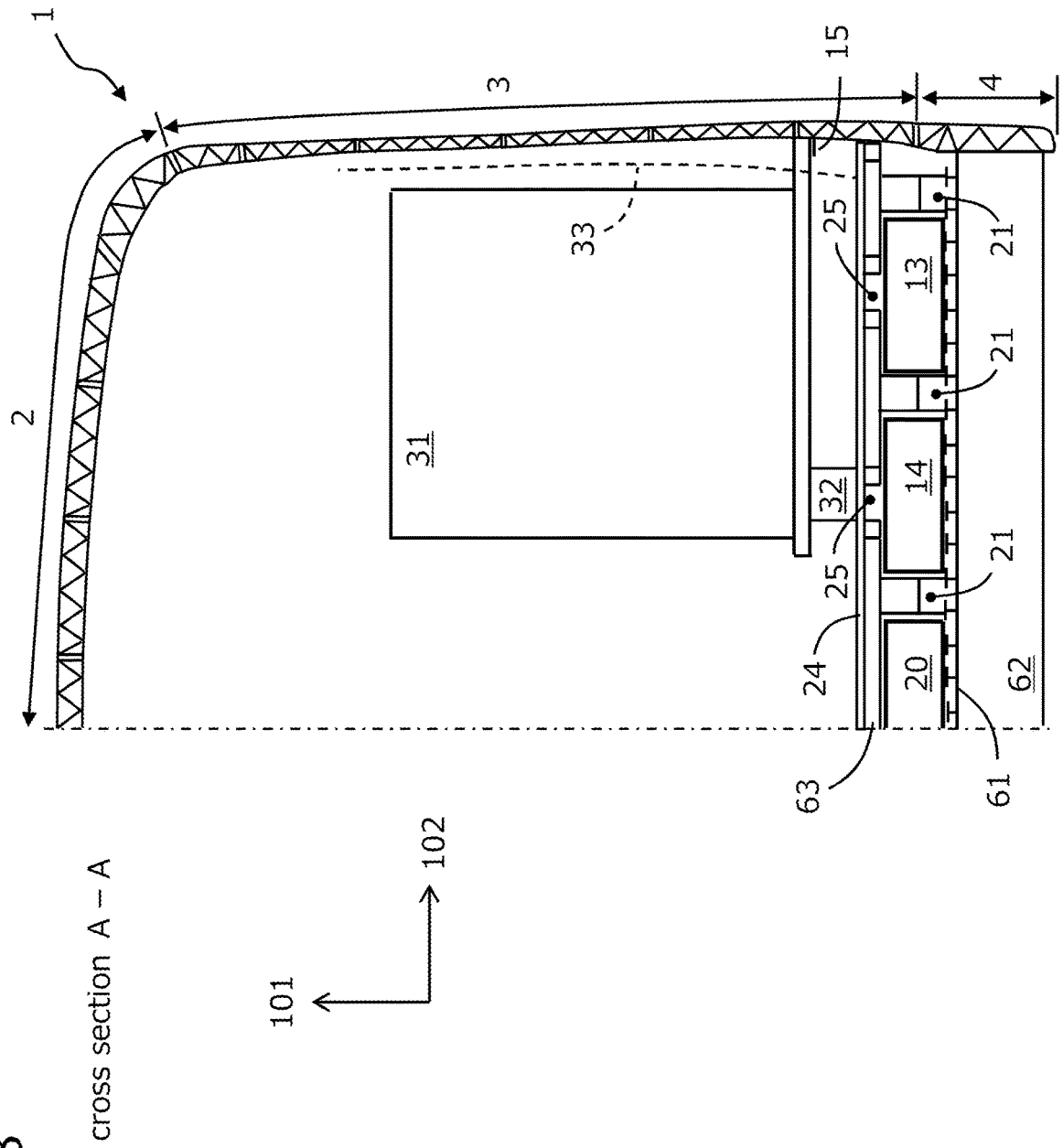
FIG. 8 is a vertical sectional view of a general portion (A-A portion) of a railroad vehicle structure depicted in FIG. 1 according to a prior art.

FIG. 7 depicts a cross sectional view taken along line A-A of the railroad vehicle structure 1 depicted in FIG. 1.

At an upper portion of the end portion underframe 12, a supply air space 51 for carrying air from the air conditioner 7 into the vehicle is provided on an end portion side in the widthwise direction 102 and a return air space 52 for carrying air from the inside of the vehicle to the air conditioner 7 is provided on the center side in the widthwise direction 102. In the spaces mentioned, the supply air duct and the return air duct described hereinabove in connection with the preceding embodiment do not exist. The supply air space 51 and the return air space 52 extend along the longitudinal direction 103 of the railroad vehicle structure 1. It is to be noted that the exhaust air duct 20 may be omitted.

Thermal insulation coating material 53 is applied to the upper face of the upper side face plate 17 of the central portion underframe 11 and the end portion underframe 12 below the supply air space 51 and the return air space 52 (to the second upper side face plate 17b and the third upper side face plate 17c of FIG. 2). The central portion floor board 22, end portion floor board 23, and floor board support 21 that supports the central portion floor board 22 and the end portion floor board 23 are made of materials having thermal insulation properties. For example, preferably the floor plate is made of wood and the floor plate support table is made of rubber.

According to the configuration described above, the advantageous effects described hereinabove in connection with the preceding embodiment are achieved. In addition, since the supply air duct and the return air duct can be omitted, further decrease in the mass and further decrease in the manufacture cost can be anticipated.

According to the present embodiment described above, while the underframe is arranged at a position at which interference thereof with underfloor equipment can be avoided, upper regions of end portions of the underframe in the widthwise direction can be used as a supply air space and a return air space for carrying supply air and return air therethrough. Further, since the thickness of the underframe at a central portion in the widthwise direction on which significant bending load acts against the airtight pressure can be made great without increasing the thickness of the hollow shaped member, sufficient rigidity and strength against the airtight pressure can be secured while increase in the mass and increase in the manufacture cost are suppressed. Consequently, it becomes possible to configure the underframe of a high speed vehicle from hollow shaped members and simplify the manufacture of the rail vehicle to reduce the manufacture cost.

It is to be noted that the present invention is not limited to the embodiments described above and includes various other modifications. For example, the above-described embodiments are described in detail for better understandings of the present invention and are not necessarily restricted to any embodiment that includes all configurations described hereinabove. Further, it is possible to replace part of components of a certain embodiment with a component of a different embodiment, and also it is possible to add components of the other embodiment to a component of a certain embodiment. Further, it is possible to perform addition, deletion or replacement of a component with respect to part of components of each embodiment.

DESCRIPTION OF REFERENCE CHARACTERS

1: Railroad vehicle structure
2: Roof structure
3: Side structure
4: Underframe
5: Gable end structure
6: Window
7: Air conditioner
11: Central portion underframe
12: End portion underframe
13: Supply air duct
14: Return air duct
15: Seat holder
16: Floor board holder
17: Upper side face plate
18: Lower side face plate
19: Closing board
20: Exhaust air duct
21: Floor board support
22: Central portion floor board
23: End portion floor board
24: Floor covering
25: Gap
31: Seat
32: Seat support
33: Interior panel
41: Supply air
42: Return air
43: Exhaust air
51: Supply air space
52: Return air space
53: Thermal insulation coating material
61: Shaped member with T ribs
62: Cross beam
63: Floor board
101: Upward and downward (heightwise) direction
102: Widthwise direction
103: Longitudinal direction

The invention claimed is:
1. A rail vehicle, comprising:
a roof structure that configures an upper face;
a side structure that configures a side face;
a gable end structure that configures an end face in a longitudinal direction;
an underframe that configures a lower face, wherein
the underframe is configured from a hollow shaped member formed from two face plates and a rib that connects the face plates to each other,
the hollow member that configures the underframe includes a first upper side face plate arranged at a central portion in a widthwise direction of the underframe, a first lower side face plate arranged at the central portion in the widthwise direction of the underframe, a second upper side face plate arranged at an end portion in the widthwise direction of the underframe and positioned below the first upper side face plate, a second lower side face plate arranged at the end portion in the widthwise direction of the underframe and positioned below the first lower side face plate, a third upper side face plate that connects the first upper side face plate and the second upper side face plate to each other, and a third lower side face plate that connects the first lower side face plate and the second lower side face plate to each other, and a space is provided below the first lower side face plate, and a closing plate that connects adjacent end portions of a pair of the second lower side face plates to each other is arranged in the space;

a floor board supported so as to extend along a substantially horizontal plane by a floor board support provided on the first upper side face plate and the second upper side face plate and/or by a floor board holder provided on the inner side of the side structure above the first upper side face plate, the second upper side face plate, and the third upper side face plate;

an air conditioner arranged below the first lower side face plate, the second lower side face plate, and the third lower side face plate;

a supply air space and a return air space configured from spaces surrounded by the second upper side face plate, the third upper side face plate, the floor board, the floor board support, and a face on the vehicle inner side of the side structure and extending in a longitudinal direction of the underframe, wherein an opening provided in and extending in an upward and downward direction through the hollow shaped member that configures the end portion in the widthwise direction of the underframe is positioned above the air conditioner, and supply air to be carried from the air conditioner to an inside of the vehicle through the opening passes through an inside of the supply air space and return air to be carried from the inside of the vehicle to the air conditioner passes through an inside of the return air space; and an exhaust air duct arranged in an inside of a space surrounded by the first lower side face plate, the third lower side face plate, and the closing plate and extending in the longitudinal direction of the underframe.

2. The rail vehicle according to claim 1, wherein the supply air space is arranged rather near to the end portion in the widthwise direction of the underframe than the return air space, gaps are formed in the floor board above the supply air space and the return air space, the gap in the floor board above the supply air space is provided in a proximity of the vehicle inner side of the side structure, and the gap in the floor board above the return air space is provided below a plurality of seats arranged in the inside of the vehicle.

3. The rail vehicle according to claim 1, wherein thermal insulation coating material is applied to upper faces of the second upper side face plate and the third upper side face plate.

4. The rail vehicle according to claim 3, wherein the floor board and the floor board support are configured from a material having a thermal insulation property.

5. The rail vehicle according to claim 1, further comprising:

a supply air duct arranged in the inside of the supply air space and extending in the longitudinal direction of the underframe; and a return air duct arranged in the inside of the return air space and extending in the longitudinal direction of the underframe, wherein supply air to be carried from the air conditioner to the inside of the vehicle passes through an inside of the supply air duct and return air to be carried from the inside of the vehicle to the air conditioner passes through an inside of the return air duct.

6. The rail vehicle according to claim 5, wherein the supply air duct is arranged rather near to the end portion in the widthwise direction of the underframe than the return air duct, gaps are formed in the floor board above the supply air duct and the return air duct, one of the gaps in the floor board above the supply air duct is provided in a proximity of the vehicle inner side of the side structure, and another one of the gaps in the floor board above the return air duct is provided below a plurality of seats arranged in the inside of the vehicle.

7. The rail vehicle according to claim 6, further comprising:

an exhaust air duct arranged in an inside of a space surrounded by the first lower side face plate, the third lower side face plate, and the closing plate and extending in the longitudinal direction of the underframe.

* * * * *